United States Patent [19]

Bauer et al.

[11] Patent Number: 4,899,375
[45] Date of Patent: Feb. 6, 1990

[54] MORE EFFICIENT CALL HANDLING FOR OPERATOR ASSISTANCE CALLS

[75] Inventors: Thomas M. Bauer, Belle Mead, N.J.; Richard W. Hemmeter, Naperville, Ill.; Robert Petrelli, Naperville, Ill.; Richard J. Piereth, Naperville, Ill.; Cyrenus M. Rubald, Naperville, Ill.

[73] Assignees: American Telephone & Telegraph Company, AT&T Bell Laboratories, Murray Hill, N.J.; American Telephone & Telegraph Company, New York, N.Y.

[21] Appl. No.: 248,459

[22] Filed: Sep. 23, 1988

[51] Int. Cl.$^4$ .............................................. H04M 3/60
[52] U.S. Cl. .................................... 379/264; 379/260
[58] Field of Search ............... 379/260, 261, 262, 263, 379/264, 265, 266, 267, 268, 67, 88, 210, 211, 212, 213, 214, 310, 311

[56] References Cited

U.S. PATENT DOCUMENTS

| | | | |
|---|---|---|---|
| 3,297,828 | 1/1967 | Baumfalk et al. | 379/260 X |
| 3,364,313 | 1/1968 | Scheinman | 379/290 |
| 3,484,560 | 12/1969 | Jaeger, Jr. et al. | 379/123 |
| 4,623,761 | 11/1986 | Winter et al. | 379/260 X |
| 4,656,624 | 4/1987 | Collins et al. | 370/60 |
| 4,797,910 | 1/1989 | Daudelin | 379/67 |

Primary Examiner—James L. Dwyer
Attorney, Agent, or Firm—Werner Ulrich

[57] ABSTRACT

A method and apparatus for processing operator assistance calls with minimum expenditure of operator work time. For collect and person-to-person calls, a first operator at a first operator position determines the type of call and, optionally, the name(s) of the calling and called parties. These are recorded in the memory of a program controlled processor system for controlling an operator assistance switching system. The first operator then disconnects from the call while the call is being set up and the call party being alerted. When the called party answers, a second operator position and second operator, having a display of the call information previously recorded, are unattached to the call to determine whether a connection between the calling and called parties should be established and, if so, to cause that connection to be so established. Advantageously, no operator position and operator need be attached to the call while the called party is being alerted; even more operator work time is saved if the called party never answers.

27 Claims, 8 Drawing Sheets

MORE EFFICIENT CALL HANDLING FOR OPERATOR ASSISTANCE CALLS

TECHNICAL FIELD

This invention relates to the processing of operator assistance telecommunications calls.

PROBLEM

In the present mode for operating the public telephone network, while the setup of many telephone calls has been completely automated, toll and assistance operators are still required for a large class of these calls. For example, toll and assistance operators are required for processing calls such as station-to-station (station) collect calls, and person-to-person (person) calls including sent paid, collect, calling card, and bill to third party calls.

Customer-dialed operator assistance calls are usually referred to as zero plus (0+) calls because the customers dial zero (signifying an operator call) plus a directory number. Operator calls that have no customer-dialed directory number are usually referred to as zero minus (0− or 00−) calls because customers do not dial further after having dialed one or two zeroes to get the intervention of an operator. A major expense in setting up operator assistance calls is the cost of the time of the operators whose services are required. In the past, the cost for setting up 0+ and 0− calls has been sharply reduced through the introduction of systems such as the Traffic Services Position System (TSPS) No. 1, and the Operator Services Position System (OSPS), both manufactured at AT&T Network Systems, which require that operators only be connected to a call during the call setup time and that operators may be recalled when needed for such operations as collecting an overtime charge on a coin call, notifying a customer of the elapsed time and charges for a call, or the recall of an operator in response to an originating customer flash initiated in response to, for example, poor transmission or a poor connection. All of these conditions are detected by timing or in response to calling customer signals. Even with these systems, for calls such as person calls and collect calls, there remains a substantial amount of recoverable time during which an operator must attend the call but is not actively servicing the call. This interval, for example, occurs from the time that a customer on a person sent paid call has given identity of the telephone number and individual to whom he or she wants to talk and the time that the called telephone is answered.

In the TSPS, the arrangements for permitting operators to be reconnected to a call are limited by a number of characteristics of the system. First, the console of the TSPS does not permit substantial alphanumeric displays so that it is not possible for one operator to record a name and for a subsequent operator to recall that name which would be associated with that call. Further, there is no alphanumeric keyboard for entering such names. Second, the TSPS does not have good arrangements for a split connection (i.e., one in which an operator can talk to either party but the other party cannot talk or listen), or for a mute connection in which one or both parties can hear but not converse. As a result, there is no good way to prevent the calling and called parties from communicating without incurring unacceptable customer dissatisfaction.

Solutions have been proposed for fully automating the setup of collect calls. For example, in Comella et al: U.S. Pat. No. 4,054,756 (Comella), customers with dual tone multifrequency key stations key a special identifier for collect calls once they have been connected to a TSPS. They would then receive a recorded announcement asking for their name. The spoken name would be recorded and would be played back in a recorded announcement to the called party who could signify his acceptance or rejection of the collect call by keying one of two numbers. This solution has several disadvantages. First, not all customers have dual tone multifrequency stations so that callers and those customers who do not have these stations would have to wait for an operator to be connected following a timeout caused by absence of a keyed signal. Second, all customers would have to be trained to dial special numbers in order to set up a collect or person call. Finally, a system like this introduces an easy method for transmitting a short message without payment; the calling customer substitutes the short message for the calling customer's name, and the called customer, who would of course refuse to accept the charges for the call, receives this short message at no charge. Since no operators would be involved, there would be no human contact to discourage or detect such fraud. In general, it appears to be unattractive in present arrangements to automate operator functions other than those of collecting digits. In summary, there is at present no satisfactory arrangement for reducing the amount of operator time required to process the setting up of an operator assistance call by making it unnecessary for an operator to stay on the call until the called party answers.

SOLUTION

The above problem is solved and an advance is made in the art in accordance with our invention wherein a first operator is connected to the call after the completion of customer dialing and, for a class of calls, this operator is disconnected from the call after determining the call type including the billing method and any required billing data; subsequently, a second operator who may or method and any required billing data; subsequently, a second operator who may or may not be the same as the first operator is connected to the call in response to the answer signal of the called customer. Advantageously, such an arrangement reduces the operator work time on the call by making it unnecessary for an operator to be connected to the call during the call setup time and ringing/busy time and if the call is not answered, the second operator is never required.

In accordance with one aspect of the invention, the first operator may record the name of the calling party for a collect call, the name of the called party on a person call, and both names for a person collect call. Subsequently, when the second operator is attached to the call, the type of call and previously entered name is displayed at the operator position of the second operator. Advantageously, such an arrangement permits a much smoother handling of the call since the second operator is ready to talk to the called party immediately upon being connected to the call without first having to ascertain from the calling party, the calling party's name or the name of the requested called party in a person call. Advantageously, such an arrangement is also more efficient since it eliminates the need for the second operator to warn the called party that this is an operator assistance call and that the operator needs to ascertain information before talking further to the called party.

In accordance with one aspect of the invention, the types of calls which are processed using this arrangement are collect calls and person-to-person calls (which include person-collect, person-paid, person calling card and person bill to third number). Advantageously, the expense reductions made possible by applying the invention to these types of calls represents the bulk of the expense reductions made possible by splitting the call set-up processing of operator assistance calls between two operators.

At the present time, a large fraction (on the order of a third) of operator assistance calls are not dialed by the customers. While such calls cannot be processed using automatic arrangements, the work time for such calls can still be reduced in accordance with the principles of this invention for collect calls and person-to-person calls.

DETAILED DESCRIPTION

Figure 1:
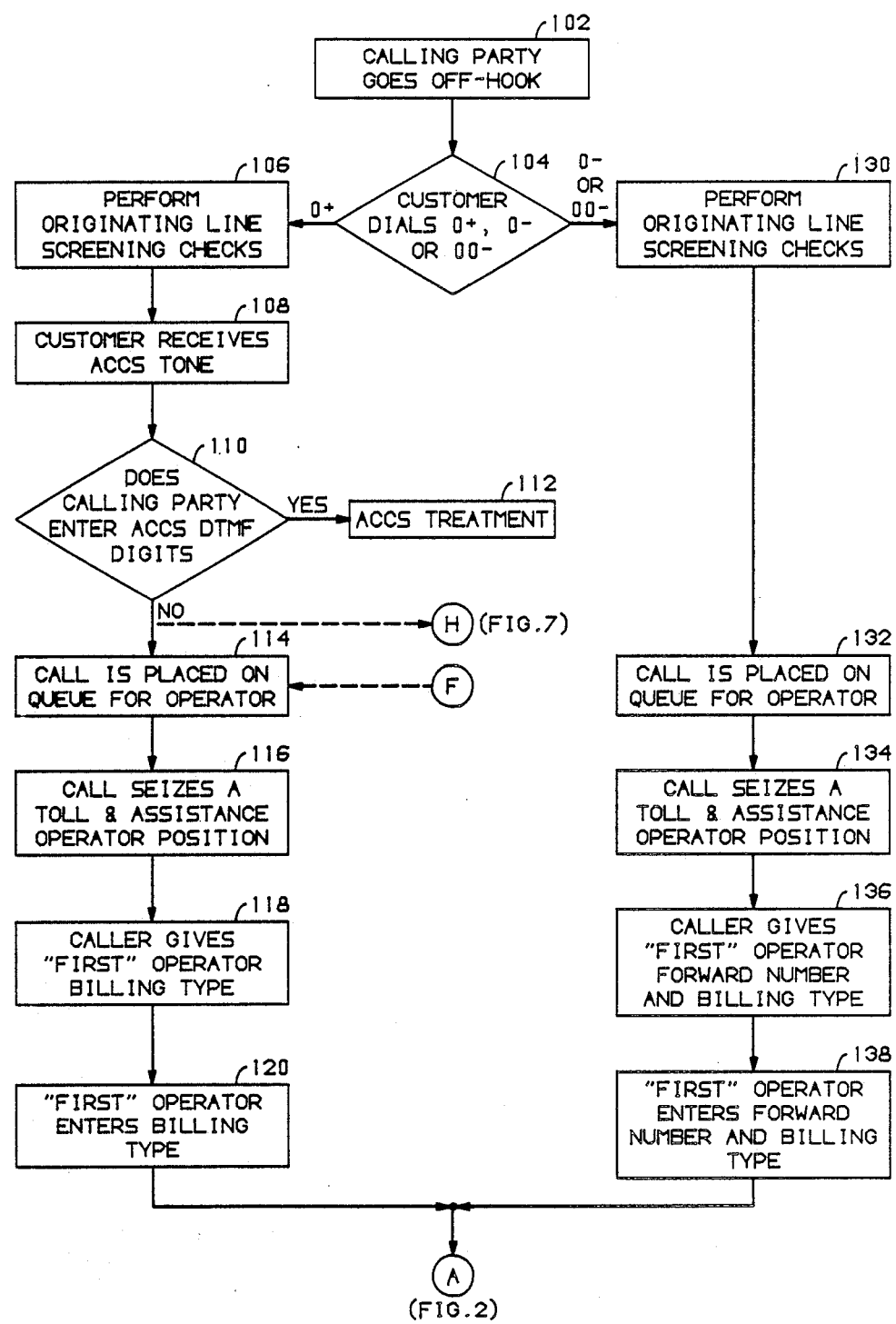
FIGS. 1-7 are flow diagrams of methods of processing operator assistance calls in accordance with the invention.

FIGS. 1-7 are flow diagrams of the method of one embodiment of the present invention. Calls that are treated in accordance with the principles of this invention are called MECH (more efficient call handling) calls. Other calls are given treatment by "standard practices" signifying treatment in accordance with the normal practices for operator assistance calls of this type as described, for example, in the *Bell System Technical Journal*, (B.S.T.J.), vol. 58, no. 6, part 1, July/August 1979, and B.S.T.J., vol. 49, no. 10, December 1970, pp. 2417-2709, especially vol. 49, pp. 2625-2683.

The process starts when the calling party goes off-hook (action block 102) i.e., lifts the handset, and starts dialing. If this is an operator assistance call, the customer dials 0+ (i.e., zero plus a directory number) or 0− or 00− (i.e., one or two zeroes not followed by any other numbers). For 0− or 00− calls, originating line screening checks are performed (action block 130) to ascertain what rate class and billing types are allowed from the calling station. Once the screening checks are successfully completed, the call is placed on a queue for an operator (action block 132). During this time, the calling party receives audible tone to indicate that an operator is being summoned to be attached to the call. The call then seizes a toll and assistance operator position (action block 134) and the caller gives the first operator (i.e., the operator first attached to the call) the forward number, i.e., directory number of the called customer (conventionally called the forward number), billing data, including the type of call, and, if appropriate, a calling card number (action block 136). The first operator enters the forward number and the charge data into a terminal that is part of the operator position for temporary recording in the memory of the operator assistance system (action block 138). The operator enters such information by causing signals to be sent from the operator position (824, FIG. 8) to a control (810, FIG. 8) of the operator assistance switching system. For convenience, such actions will be referred to hereinafter as the operator signaling the assistance system to control a connection or to enter data. Subsequent actions are described with respect to action block 202, FIG. 2.

If the customer has dialed 0+, then originating line screening checks are performed (action block 106) as described with respect to block 130 and the customer receives automatic calling card service tone (action block 108). The system then tests whether the calling party enters a calling card number by keying dual tone multifrequency (DTMF) digits. If so, the call is given automatic calling card service treatment according to standard practices (action block 112) and as described, for example, in *Bell System Technical Journal*, vol 58, no. 6, part I, July/August 1979, pp. 1207-1305. If the calling party enters zero or does not enter any DTMF digits, indicating that this is not an automatic calling card service call, the call is placed on a queue for subsequent connection to an operator (action block 114). Subsequently, the call seizes a toll and assistance operator position (action block 116, similar to action block 134), and the caller gives the first operator the billing type of the call (action block 118). This first operator then enters the billing type into the operator's terminal (action block 120). Subsequent actions are described with respect to action block 202, FIG. 2.

Figure 2:
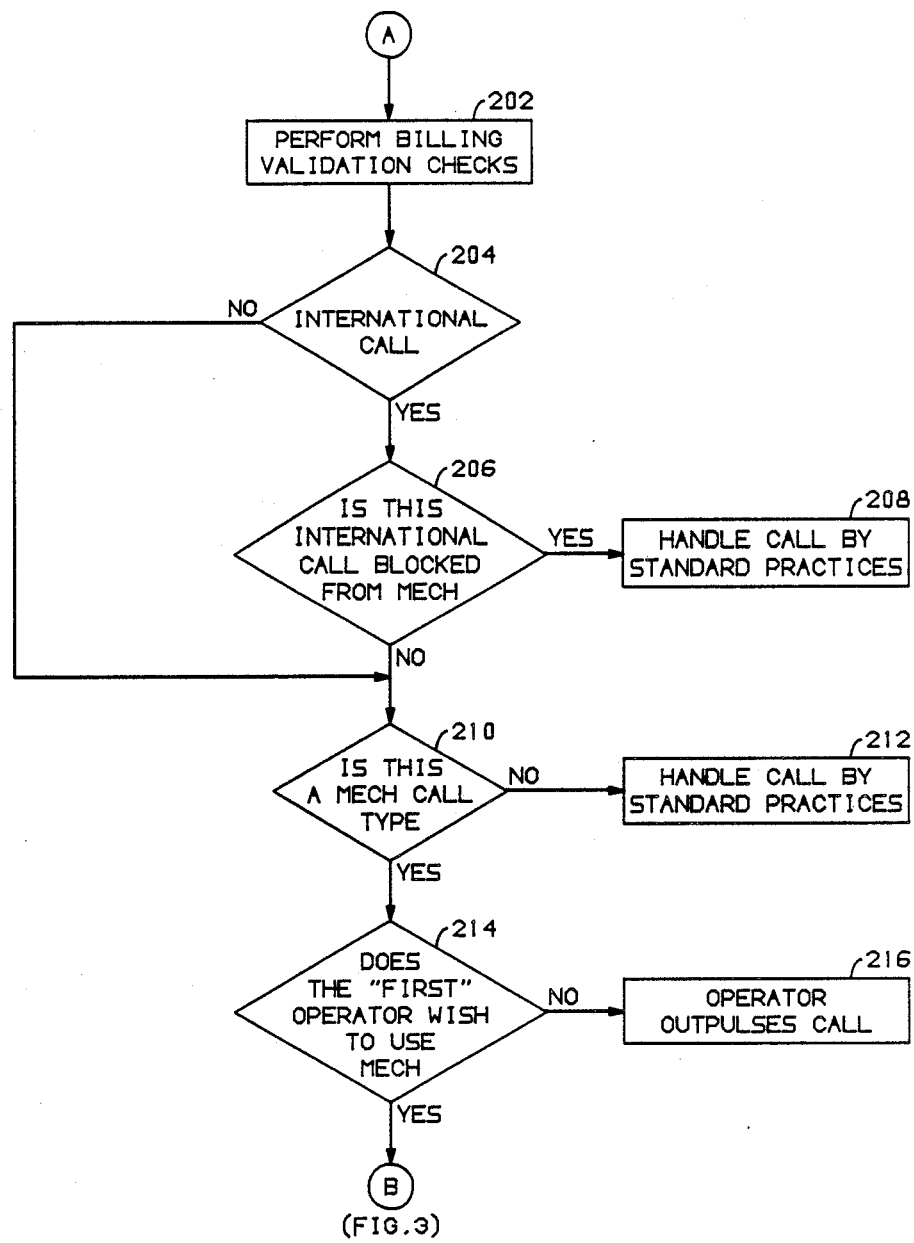

FIG. 2 shows subsequent operator actions leading up to a decision to process the call in accordance with the principles of this invention, i.e., to use MECH. First, billing validation checks are performed to see if the calling customer is entitled to place this type of call to the called station (action block 202). For example, a collect call to a coin phone is not usually allowed. For the case of a person call that is to be billed to a third party, this includes verifying whether the third party accepts such billing or wishes to be called, and, if necessary, calling that third party to verify acceptance of the billing. If the call is allowed, test 204 is used to determine whether this is an international call. If so, test 206 determines whether this international call is to be blocked from MECH treatment. For example, blocking may be desirable if the call is to a non-English speaking country for which calls an English language MECH announcement would be confusing. If so, the international call is handled by standard practices (action block 208). If international calls may be handled using MECH, or if this is not an international call, test 210 is used to determine if this is a MECH type of call, i.e., a person-to-person call or a collect call. If not, the call is handled using standard call handling practices (action block 212). If so, the first operator makes the decision of whether or not to use MECH. For example, if the first operator decides that the calling customer has had problems communicating, it would be better to continue to monitor the call. If the operator does not wish to use MECH, then the operator sends signals to control the outpulsing of the call to a distant telephone central office (action block 216) in order to set up the connection from the operator to the called customer (the "forward" connection) as is done today. If the operator wishes to use MECH for this call, then the actions described in the flow chart of FIG. 3 are performed starting with action block 302.

Figure 3:
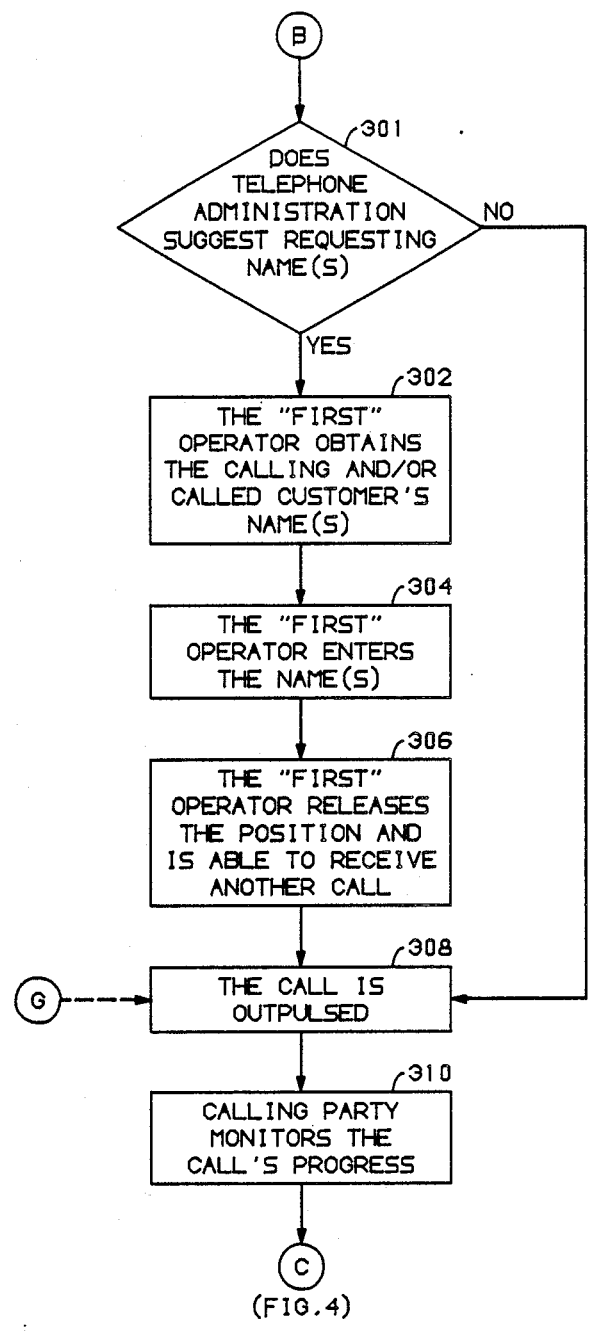

FIG. 3 describes the actions performed by the first operator to set up a MECH call. The operator's actions are determined partly by the practices of the telephone administration. If the telephone administration suggests that the operator request name(s) from the calling party ("yes" output of test 301), then the first operator may obtain the calling and/or called customers' names (action block 302). For a collect call, only the calling customer's name is required. For a person call, the called customer's name is required. For a person-collect call, both names are required. The name(s) are entered via the operator terminal (action block 304) into the control of the assistance system and the first operator then signals to be released from the call and the system releases the position which is thereafter able to accept another call (action block 306). If the administration does not suggest entering name(s) at this stage, the "first" operator releases the position (action block 306) without performing the actions of blocks 302 and 304.

Telephone administrations may prefer to use the second operator to obtain name(s) because so many calls are unanswered and for these calls, it is not necessary to obtain any names. The call is then automatically outpulsed to the telephone central office connected to the called customer (action block 308) and the calling party is left to monitor the progress of the call (action block 310). In effect, it is left to the calling party to decide whether there is no answer or to detect a busy signal or overflow tone. The "outpulsing" can be done over talking trunks or via separate common channel signaling facilities. It is the calling party who detects busy or no answer and initiates a disconnect for those cases. The operator assistance system monitors the connection to detect the return of answer supervision. Subsequent actions are described with respect to the flow chart FIG. 4 starting with test 402.

Figure 4:
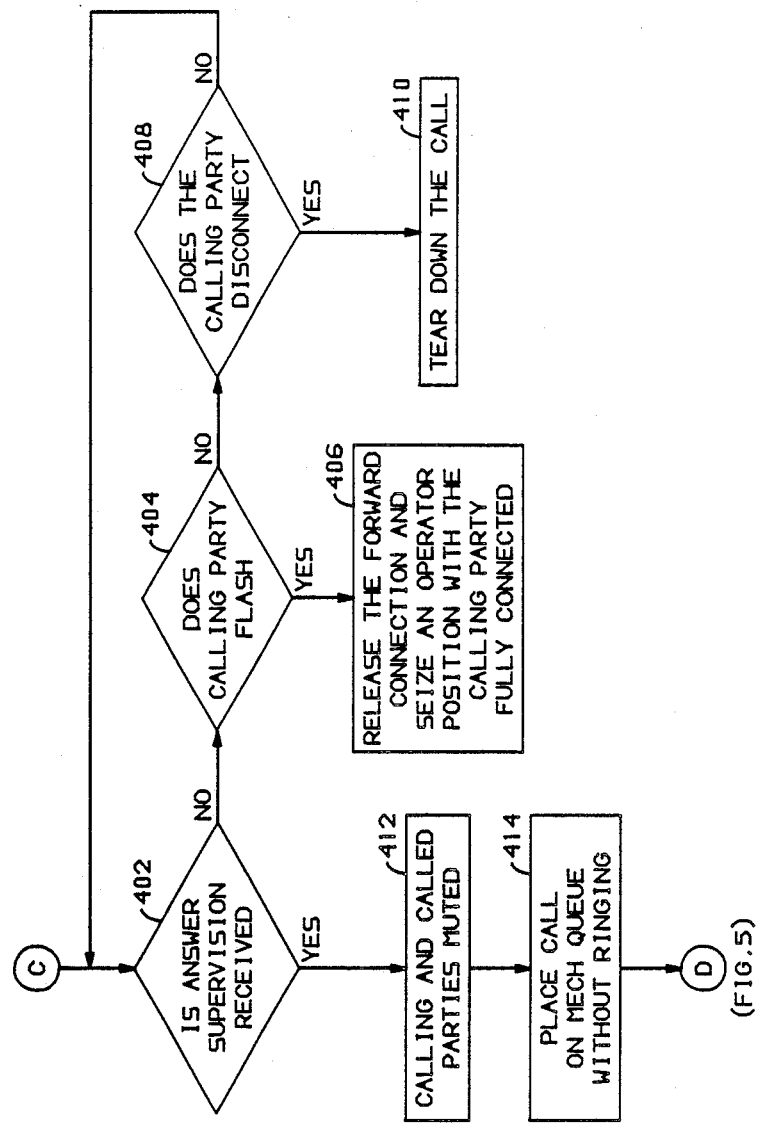

FIG. 4 describes the process of detecting an answer from the called party and the actions performed immediately thereafter. Test 402 checks whether answer supervision is received, i.e., whether the called party answers. If not, test 404 is performed to test whether the calling party has flashed. If the calling party has flashed, then the forward connection, i.e., the connection to the called party is released and an operator position is connected to the calling party to receive further instructions (action block 406). The calling party and operator are fully connected to allow the calling customer to talk to and heat the operator at the operator position where the call history is displayed to the operator. If the calling party does not flash, a test is made to check whether the calling party disconnects (test 408). If the calling party disconnects, the call is torn down (action block 410). This action would be performed if the calling party decides that the called party is not answering or if the calling party hears busy or overflow tone. If the calling party does not disconnect, supervisory monitoring of the call for answer is resumed (test 402, previously discussed). If answer supervision is received as detected in test 402, the calling and called parties are connected to an operator position with the calling party muted, i.e., unable to have his voice signals transmitted to the operator of the called party. If an operator position is not available, the connection is arranged so that both the calling and the called parties are muted, i.e., that neither calling nor called party can hear the other. The call is then placed on a high priority queue for an operator position without giving audible tone to either the calling or the called party in order to avoid confusion. There may be several such queues in an operator assistance system, for queuing different types of MECH calls. Next, the actions described in FIG. 5 are performed starting with test 502.

Figure 5:
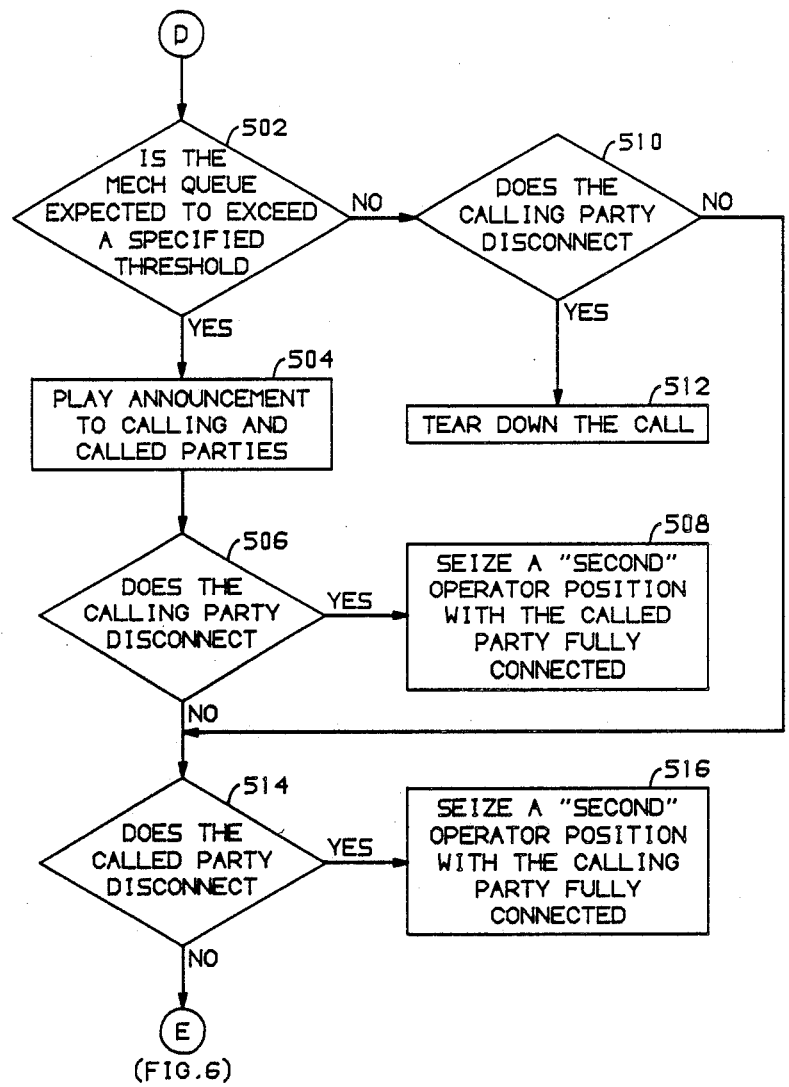

FIG. 5 describes the actions performed until a second operator position can be connected to the call. Test 502 determines whether the MECH queue (i.e., the queue in which the call was entered in action block 414) is expected to introduce a delay that exceeds a specified threshold. If so, an announcement is played to both the calling and the called parties (action block 504). The announcement might say: "Please hold, an operator will be connected promptly". If the calling party disconnects, as determined by test 506, then a second operator position is seized so that the second operator may talk to the called party to explain what happened. The second operator position and the called party are fully connected to allow them to talk to each other.

If the calling party disconnects before an announcement is played, as determined by test 510, then the call is torn down (action block 512). If the calling party does not disconnect, with or without the announcement, then a test is made to see whether the called party has disconnected (test 514). If so, a second operator position is seized and a connection is set up with the calling party (action block 516). The calling party and the second operator are fully connected. Flashes by the calling party are ignored, if received, prior to a called party disconnect or prior to the actions to be discussed below with respect to FIG. 6, starting with action block 602, because the call is already on a high priority queue for an operator.

Figure 6:
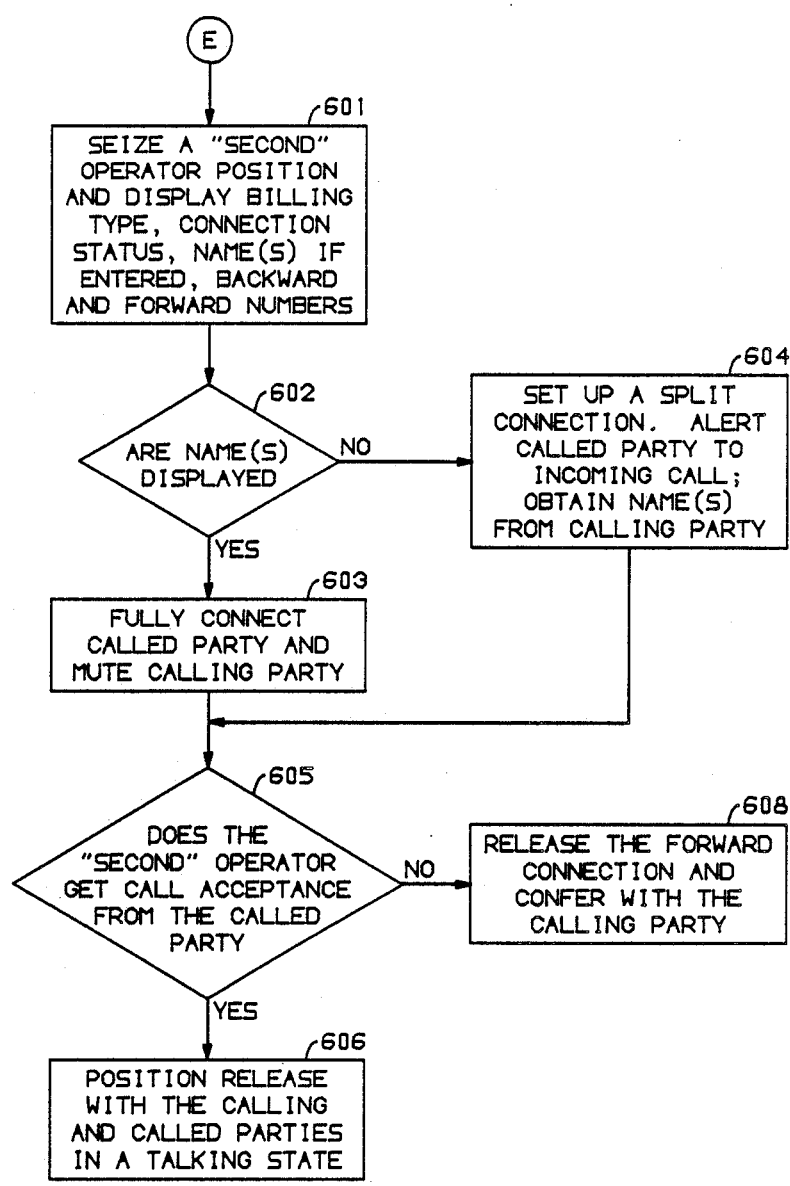
Figure 7:
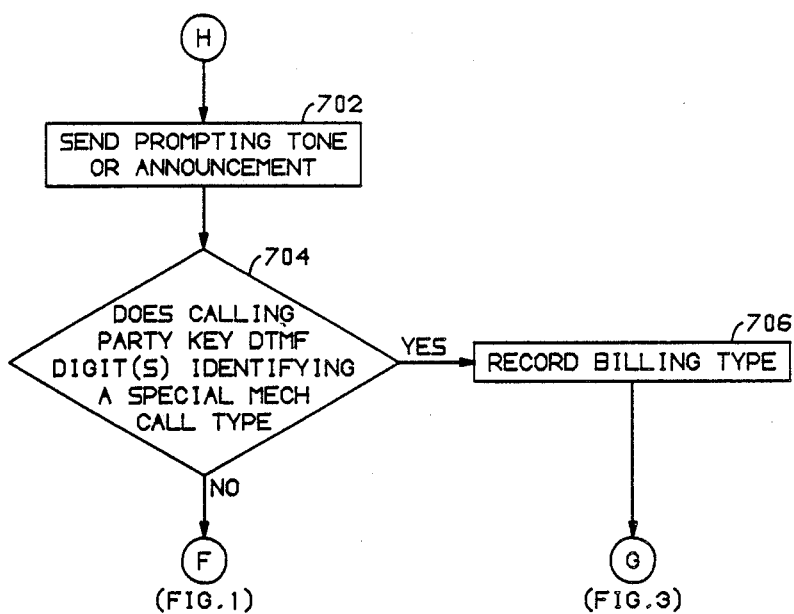

FIG. 6 describes the actions performed by the second operator for a MECH call. The second operator position is seized, and the billing type, the connection status, and the forward and backward numbers, i.e., the called and calling numbers, are displayed (action block 601). If the appropriate names have been entered by the first operator, these are also displayed. Test 602 checks whether these names are displayed. If so, the operator signals for a connection wherein the called party is fully connected and the calling party is muted to prevent unauthorized transmission of a message from the calling party (action block 603). If not, the operator signals to set up a split connection, the called party is alerted by the operator that there is an incoming call, and the calling party is queried to obtain the appropriate name(s) (action block 604). This is the information needed by the second operator to find out if a called party is willing to accept charges for a collect call, or to find out if the appropriate individual has answered a person-to-person call, and, if not, to ask for that appropriate individual. In either case, the second operator seeks to get an acceptance of the call from the called party. If the second operator is satisfied that the conditions for setting up the call have been met (positive output of test 605), then the operator position signals to be released from the call and the calling and called parties are connected in a full talking state (action block 606). If the second operator fails to get an acceptance of the call, (negative output of test 605) then the second operator signals to release the forward connection (the connection to the called party) and confers further with the calling party via a full talking state connection (action block 608).

Alternatively, for 0+ calls, other arrangements can be made to recognize MECH calls automatically and therefore bypass the first operator. In one alternative embodiment shown on FIG. 7, a test 704 follows test 110 of FIG. 1. Test 704 is preceded by sending a prompting tone or announcement to the calling party of action block 702, entered via interfigure symbol H (152) requesting the calling party to key a digit identifying one of the MECH call types that can be processed without a first operator. This includes collect, person paid, and person collect calls. Test 704 determines whether the calling party has keyed one of these digits. If not, block 114 (FIG. 1), previously described, is entered via interfigure symbol F (750). If so, the billing type identified by the keyed digit, and including data that no first operator was used, is recorded (action block 706) and call processing continues via interfigure symbol G (752) with action block 308 (FIG. 3). For these calls, the actions of block 604 (FIG. 6) are performed as discussed supra because no record of names has been entered.

Figure 8:
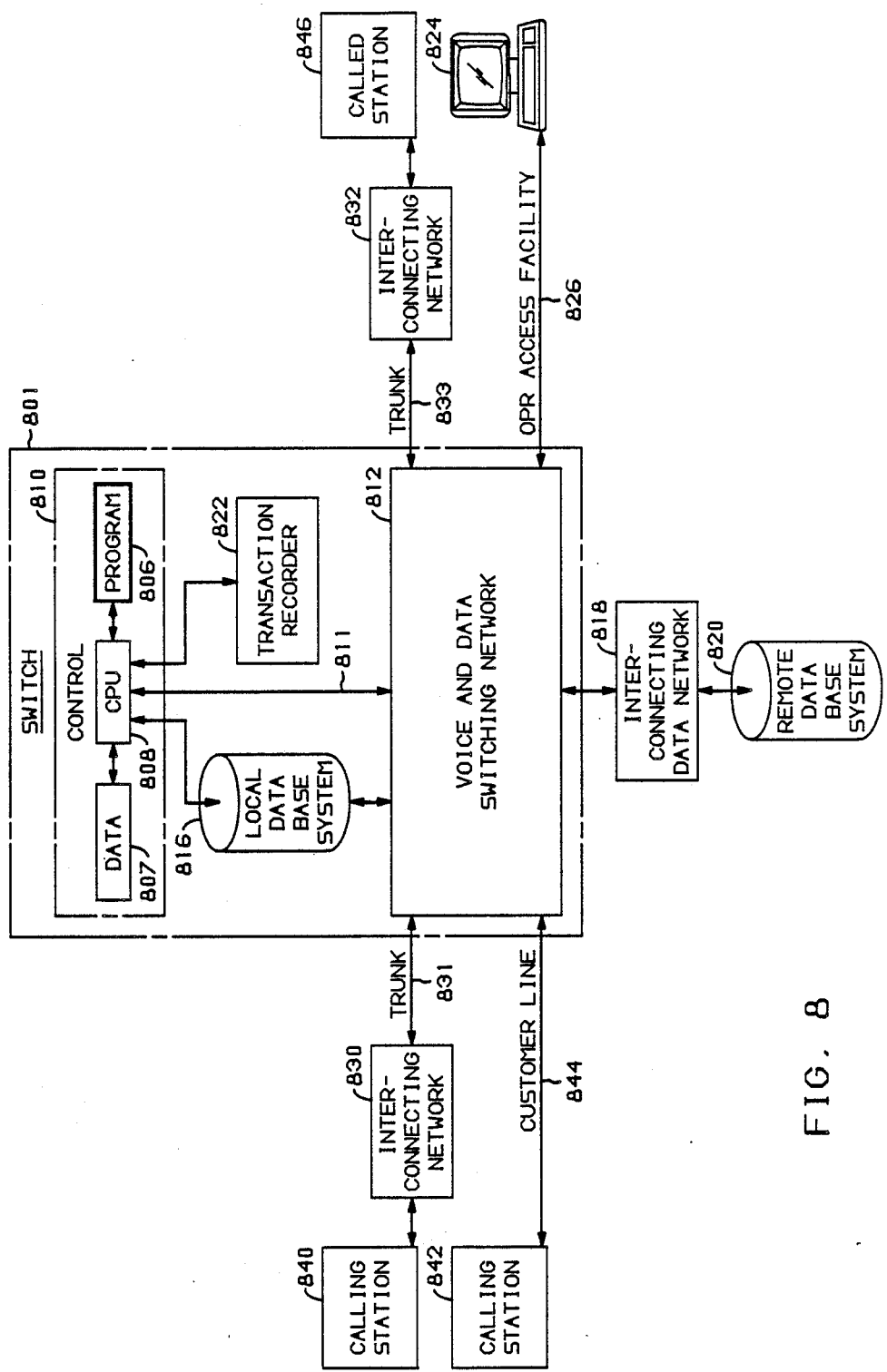
FIG. 8 is a block diagram of an operator assistance switching system for processing operator assistance calls in accordance with the methods of FIGS. 1-7.

FIG. 8 is a block diagram of a switching system for implementing the present invention. The switching system, a 5ESS® switch, extensively described in *AT&T Technical Journal*, vol. 64, no. 6, part 2, pp. 1305–1564, July/August 1985, which also serves as an Operator Services Position System (OSPS) as described in N. X. DeLessio et al.: "An Integrated Operator Services Capability for the 5ESS Switching System", *International Switching Symposium '84*, (Florence), Session 22C, Paper 3, pp. 1–5, May 1984. The change required in the system to implement the present invention is the addition of a program in the control of the switch for executing the tasks described in the flow charts of FIGS. 1–7. The switch 801 comprises a control 810 for controlling the switch. The control 810, in turn, comprises a central processing unit 808, a program 806 for controlling the operations of the central processing unit, and a data store 807 for storing call data. The switch also comprises a local data base system 816 for storing data about operator positions connected to the system, interconnecting networks 830 and 832, trunks, such as trunk 831 connected to the system, and customer lines, such as customer line 844 connected to the system. A transaction recorder 822 is used for recording billing data. The switch also comprises a voice and data switching network 812 which can be used for transmitting data among control unit 810 interconnecting data network 818 and operator access facility 826, and for transmitting voice among trunks coming into the system, such as trunk 831 to interconnecting network 830, and trunk 833 to interconnecting network 832, customer lines such as customer line 844 and operator access facilities such as operator access facility 826. The interconnecting network 832 which may include one or more switching systems is used for accessing the called customer station 846 from switch 801. Operator position 824, connected to the voice and data switching network 812 by operator access facility 826, comprises a video terminal for displaying data obtained from control 810, local data base system 816, and remote data base system 820. Remote data base system 820 is connected to voice and data switching network 812 via interconnecting data network 818. Interconnecting data network 818 and remote data base system 820 are used for obtaining data about the calling or called terminal and/or called station when this data is not available in the local data base system 816.

Calling station 840 is connected to switch 801 via an interconnecting network 830, which, like interconnecting network 832, comprises one or more switches and interconnecting trunk 831, whereas calling station 842 is connected directly to switch 801 via customer line 844. A calling station, such as 840 or 842 is originally connected via voice and data switching network 812 and operator access facility 826 to an operator position 824 for the first operator communications. Subsequently, the connection to the operator position 824 is released until a connection to the called station is set up via trunk 833 and interconnecting network 832 to called station 846, and an answer from the called station 846 is detected in the voice and data switching network 812 and relayed via control connection 811 to control 810. Control 810 then causes a connection to be set up among the calling station, the called station and second operator position, similar to operator position 824, connected via its own operator access facility, similar to operator access facility 826. Data describing the call is then displayed on the second operator's terminal to permit the second operator to further control the call by signaling requests for changes in the call configuration to the control 810.

We claim:

1. A method of setting up an operator assistance call from a calling party to a called party, comprising the steps of:

connecting said party to a first operator position;

responsive to first signals from said first operator position, disconnecting said first operator position and setting up a connection to said called party; and responsive to receipt of an answer signal from said called party, setting up a connection between a second operator position, which may be different from said first operator position, and said called party.

2. The method of claim 1 further comprising the step of:

prior to said step of disconnecting said first operator position and setting up a connection, responsive to second signals from said first operator position, recording an identification of a type of call.

3. The method of claim 2 further comprising the step of:

prior to said step of disconnecting said first operator position and setting up the connection, responsive to third signals from said first operator position, recording at least one of an identification of a calling customer and an identification of a called customer.

4. The method of claim 3 further comprising the step of:

displaying said at least one of an identification of a calling customer and a called customer at said second operator position.

5. The method of claim 2 further comprising the step of:

displaying said call type at said second operator position.

6. The method of claim 2 further comprising the step of:

setting up a muted connection between said second operator position and said calling party.

7. The method of claim 2 further comprising the step of:

setting up a split connection between said second operator position and said calling and called parties whereby said calling and said called parties cannot communicate as long as said split connection is retained.

8. The method of claim 1 further comprising the step of:

responsive to receipt of a signal from said second operator position, setting up a talking connection between said calling customer and said called customer.

9. The method of claim 1 wherein said step of setting up a connection between a second operator position and said called party comprises the step of queuing for an available second operator position.

10. The method of claim 9 wherein said step of queuing up for a second operator position comprises the step of:
   queuing in a high priority queue for said available second operator position.

11. The method of claim 9 wherein said queuing step comprises the step of transmitting an announcement to said called party.

12. The method of claim 1 further comprising the step of:
   responsive to second signals from said first operator position, recording a telephone number of said called party.

13. The method of claim 1 further comprising the step of:
   prior to connecting said calling party to said first operator position, recording a telephone number of said called party in response to signals from said calling party.

14. Apparatus for setting up an operator assistance call from a calling party to a called party under the control of at least one operator position, comprising:
   a switching network connectable to said calling party, said called party, and said at least one operator position; and
   control means, for controlling establishment of connections through said switching network;
   wherein said control means is operable under the control of a program for controlling the following operations:
   connecting said calling party to a first operator position;
   responsive to first signals from said first operator position, disconnecting said first operator position and setting up a connection to said called party; and
   responsive to receipt of an answer signal from said called party, setting up a connection between a second operator position, which may be different from said first operator position, and said called party.

15. The apparatus of claim 14 wherein said control means is further operable under the control of said program for controlling the following operation:
   prior to said disconnecting said first operator position and setting up a connection, responsive to second signals from said first operator position, recording an identification of a type of call.

16. The apparatus of claim 15 wherein said control means if further operable under the control of said program for controlling the following operation:
   prior to said disconnecting said first operator position and setting up the connection, responsive to third signals from said first operator position, recording at least one of an identification of a calling customer and an identification of a called customer.

17. The apparatus of claim 15 wherein said control means is further operable under the control of said program for controlling the following operation:
   displaying said at least one of an identification of a calling customer and a called customer at said second operator position.

18. The apparatus of claim 15 wherein said control means is further operable under the control of said program for controlling the following operation:
   displaying said call type at said second operator position.

19. The apparatus of claim 15 wherein said control means is further operable under the control of said program for controlling the following operation:
   setting up a muted connection between said second operator position and said calling party.

20. The apparatus of claim 15 wherein said control means is further operable under the control of said program for controlling the following operation:
   setting up a split connection between said second operator position and said calling and called parties whereby said calling and said called parties cannot communicate as long as said split connection is retained.

21. The apparatus of claim 14 wherein said control means is further operable under the control of said program for controlling the following operation:
   responsive to receipt of a signal from said second operator position, setting up a talking connection between said calling customer and said called customer.

22. The apparatus of claim 14 wherein said control means is further operable under the control of said program for controlling the following operation:
   queuing for an available second operator position prior to setting up a connection between said second operator position and said called party.

23. The method of claim 22 wherein said queuing comprises queuing in a high priority queue for said available second operator position.

24. The method of claim 14 wherein said control means is further operable under the control of said program for controlling the following operation:
   responsive to second signals from said first operator position, recording a telephone number of said called party.

25. The method of claim 14 wherein said control means is further operable under the control of said program for controlling the following operation:
   prior to connecting said calling party to said first operator position, recording a telephone number of said called party in response to signals from said calling party.

26. A method of setting up an operator assistance call from a calling party to a called party, comprising the steps of:
   recording a telephone number of said called party in response to signals from said calling party;
   connecting said calling party to a first operator position;
   responsive to second signals from said first operator position, recording an identification of a type of call;
   responsive to third signals from said first operator position, recording at least one of an identification of a calling customer and an identification of a called customer;
   responsive to first signals from said first operator position, disconnecting said first operator position and setting up a connection to said called party;
   responsive to receipt of an answer signal from said called party, queuing in a high priority queue for an available second operator position;

setting up a connection between said available second operator position, which may be different from said first operator position, and said called party;
setting up a muted connection between said second operator position and said calling party;
displaying said call type at said second operator position;
displaying said at least one of an identification of a calling customer and a called customer at said second operator position; and
responsive to receipt of a signal from said second operator position, setting up a talking connection between said calling customer and said called customer.

27. The method of claim 1 further comprising the step of:
responsive to receipt of a signal from said second operator position, initiating a charging record for said operator assistance call.

* * * * *

UNITED STATES PATENT AND TRADEMARK OFFICE
CERTIFICATE OF CORRECTION

PATENT NO. : 4,899,375

DATED : February 6, 1990

INVENTOR(S) : Thomas M. Bauer, Richard W. Hemmeter, Robert Petrelli, Richard J. Piereth, Cyrenus M. Rubald It is certified that error appears in the above-identified patent and that said Letters Patent is hereby corrected as shown below:

Column 2, line 43, delete "method and any required billing data; sub-'

Column 2, line 44, delete "sequently, a second operator who may or".

Claim 1, column 8, line 19, after "said" insert --calling--.

Claim 16, column 9, line 56, delete "if" and substitute --is--.

Claim 17, column 9, line 63, delete "15" and substitute --16--.

Signed and Sealed this

Twenty-second Day of October, 1991

Attest:

HARRY F. MANBECK, JR.

*Attesting Officer*        *Commissioner of Patents and Trademarks*